US012752647B2

(12) United States Patent
Aoki et al.

(10) Patent No.: US 12,752,647 B2
(45) Date of Patent: Oct. 6, 2026

(54) CHARGING INLET

(71) Applicant: Yazaki Corporation, Tokyo (JP)

(72) Inventors: Yusuke Aoki, Kakegawa (JP); Naoto Ikeya, Kakegawa (JP); Toru Yamada, Kakegawa (JP); Hidetaka Hondo, Sagamihara (JP)

(73) Assignee: Yazaki Corporation, Tokyo (JP)

( * ) Notice: Subject to any disclaimer, the term of this patent is extended or adjusted under 35 U.S.C. 154(b) by 554 days.

(21) Appl. No.: 18/514,044

(22) Filed: Nov. 20, 2023

(65) Prior Publication Data

US 2024/0174094 A1 May 30, 2024

(30) Foreign Application Priority Data

Nov. 30, 2022 (JP) ................................ 2022-192206

(51) Int. Cl.
*B60L 53/16* (2019.01)

(52) U.S. Cl.
CPC .................................... *B60L 53/16* (2019.02)

(58) Field of Classification Search
CPC ........................................................ B60L 53/16
USPC .......................................................... 320/109
See application file for complete search history.

(56) References Cited

U.S. PATENT DOCUMENTS

| | | | | |
|---|---|---|---|---|
| 12,668,140 | B2 * | 6/2026 | Aoki | B60L 53/16 |
| 2020/0153157 | A1 | 5/2020 | Iwami et al. | |
| 2024/0174096 | A1 * | 5/2024 | Aoki | B60L 53/16 |

* cited by examiner

*Primary Examiner* — Daniel A Hess
(74) *Attorney, Agent, or Firm* — Sughrue Mion, PLLC

(57) ABSTRACT

A charging inlet includes: a plurality of terminals; and a housing accommodating the terminals therein. Each of the terminals includes: a first connected portion having a solid cylindrical shape; a second connected portion; and a middle portion. A rubber component is disposed on an outer circumference of the middle portion. The rubber component includes: a cylindrical portion; and a flange connected to the cylindrical portion and having a ring shape with a larger diameter than the cylindrical portion. The rubber component is embedded in the housing. The rubber components are interposed between the housing and the terminals so that the terminals are held in a displaceable manner by the housing.

4 Claims, 10 Drawing Sheets

CHARGING INLET

BACKGROUND OF THE INVENTION

Technical Field

The present invention relates to a charging inlet.

Background Art

For example in an electric vehicle and hybrid vehicle, a vehicle body is equipped with a connector for charging a battery installed on the vehicle (see e.g. Patent Document 1). Such a connector is generally called "charging inlet". FIGS. 7 to 10 shows a charging inlet as an example for conventional charging inlets.

A charging inlet 501 as shown in FIGS. 7 to 9 is intended to be mated with a charging plug which is not shown. The charging inlet 501 includes a plurality of terminals 502, a housing 505 accommodating the terminals 502 therein, and a terminal holder 504 integrated to the housing 505.

The terminals 502 are shaped by means of cutting. As shown in FIGS. 8 and 10, each of the terminals 502 includes a first connected portion 521 formed in a solid cylindrical shape, a second connected portion 522, a middle portion 523 between the first connected portion 521 and the second connected portion 522, and a flange 526 formed in a ring shape around an outer circumference of the middle portion 523. The first connected portion 521 is intended to be mated with a terminal provided in the charging plug. The second connected portion 522 is a portion connected to an electric wire 503. The second connected portion 522 is formed in a cylindrical shape which is coaxial with the first connected portion 521, wherein the second connected portion 522 includes a recess 524 with the electric wire 503 inserted therein.

The housing 505 includes an inner housing 552 and hood section 551, wherein the inner housing 552 accommodates the plurality of terminals 502 therein. For each of the terminals 502, the inner housing 552 includes a first accommodating portion 553, a second accommodating portion 554 and a communication portion 556 formed therein.

The first accommodating portion 553 is configured as a space which is open toward a front side of the charging inlet 501, wherein the first accommodating portion 553 accommodates a front half of the first connected portion 521. The second accommodating portion 554 is configured as a space which is open toward a back side of the charging inlet 501, wherein the second accommodating portion 554 accommodates the middle portion 523, the flange 526 and the second connected portion 522. The communication portion 556 is configured as a space through which the first accommodating portion 553 is in communication with the second accommodating portion 554, wherein the communication portion 556 accommodates a back half of the first connected portion 521.

The terminal holder 504 is arranged such that the flange 526 is clamped between the terminal holder 504 and a deepest side 557 of the second accommodating portion 554 to prevent the terminals 502 from being removed out of the inner housing 552.

CITATION LIST

Patent Literature

Patent Document 1: JP 2020-77573 A

SUMMARY OF THE INVENTION

Since the charging inlet 501 as described above is configured such that the terminals 502 are fixed in the housing 505 by the terminal holder 504, the charging inlet 501 has the problem that it is not possible to adjust a radial position of the terminals 502 depending on terminal misalignment of the charging plug.

Therefore, an objective of the present invention is to provide a charging inlet which enables a radial position of a terminal to be adjusted within a housing depending on terminal misalignment of a charging plug.

According to the present invention, a charging inlet includes: a terminal; and a housing accommodating the terminal therein, wherein the terminal includes: a first connected portion having a solid cylindrical shape; a second connected portion disposed coaxially with the first connected portion; and a middle portion between the first connected portion and the second connected portion, wherein a rubber component is disposed on an outer circumference of the middle portion, wherein the rubber component includes: a cylindrical portion; and a flange connected to the cylindrical portion and having a ring shape with a larger diameter than the cylindrical portion, wherein the rubber component is embedded in the housing, and wherein the rubber component is interposed between the housing and the terminal so that the terminal is held in a displaceable manner by the housing.

According to the present invention, a method of producing the charging inlet successively includes: a terminal shaping step of shaping the terminal by means of cutting; a rubber component molding step of molding the rubber component by means of insert molding in which the terminal is placed in a mold for producing the rubber component; a plating step of plating an exposed outer surface of the terminal except for a portion of the terminal with the rubber component disposed thereon; and a housing molding step of molding the housing by means of insert molding in which the terminal integrated with the rubber component is placed in a mold for producing the housing.

The present invention enables a radial position of a terminal to be adjusted within a housing depending on terminal misalignment of a charging plug.

DETAILED DESCRIPTION OF PREFERRED EMBODIMENTS

A "charging inlet" according to an embodiment of the present invention will be explained with reference to FIGS. 1 to 6.

Figure 1:
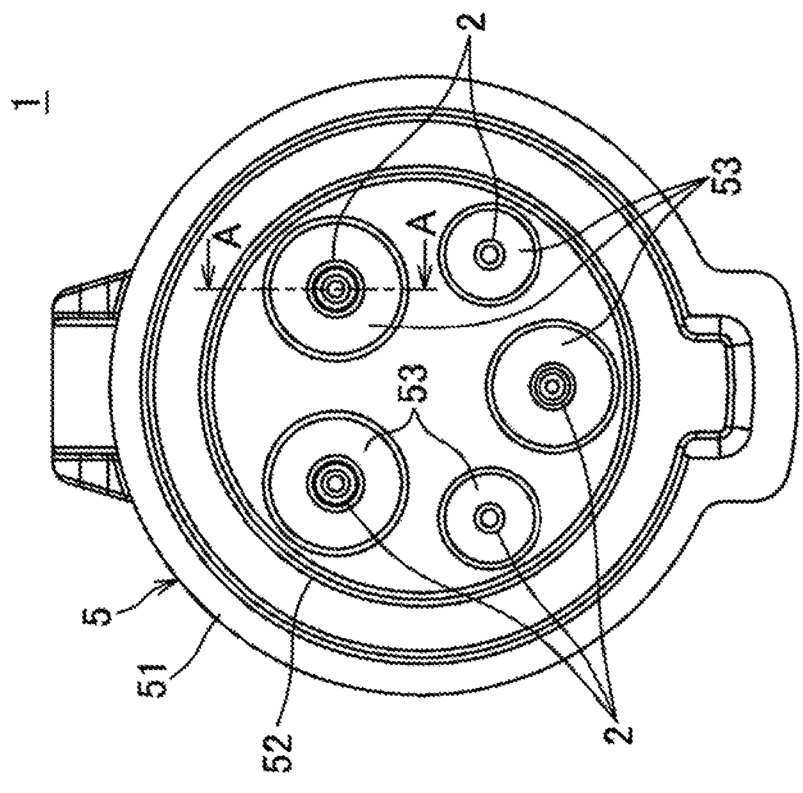
FIG. 1 shows a front view of a charging inlet according to an embodiment of the present invention.
Figure 2:
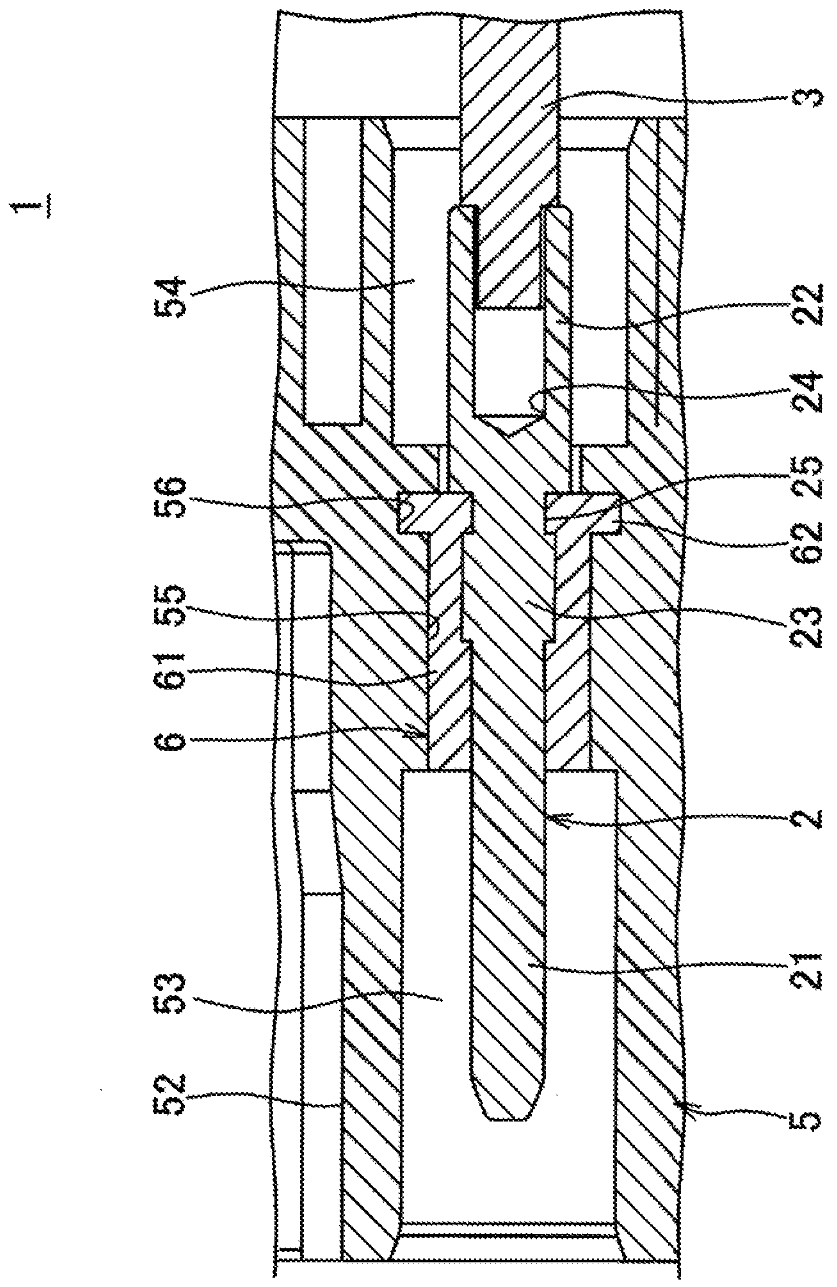
FIG. 2 shows a sectional view along the line A-A in FIG. 1.
Figure 3:
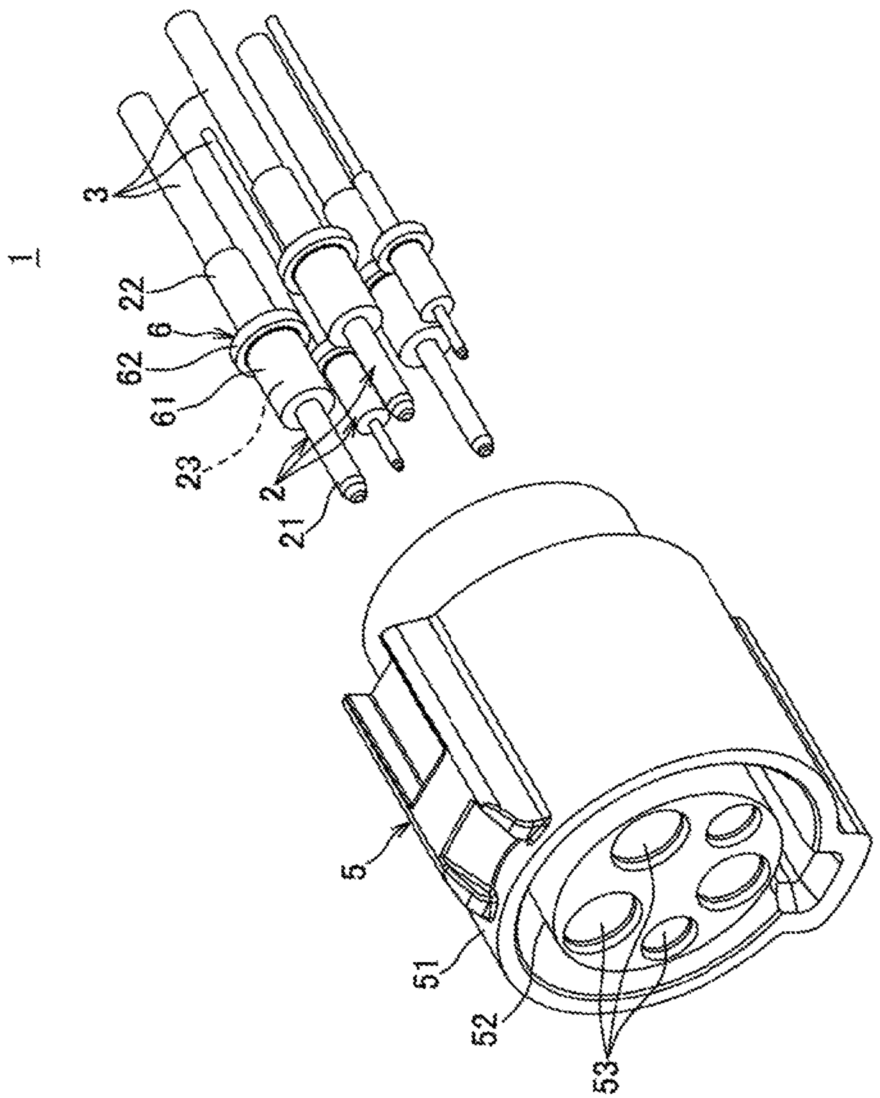
FIG. 3 shows an exploded view of the charging inlet according to FIG. 1.

A charging inlet 1 as shown in FIGS. 1 to 3 is installed to a vehicle body of e.g. an electric vehicle or a hybrid vehicle and configured to be mated with a charging plug which is not shown. The charging inlet 1 includes a plurality of terminals 2 and a housing 5, wherein the housing 5 accommodates the terminals 2 therein.

Figure 4:
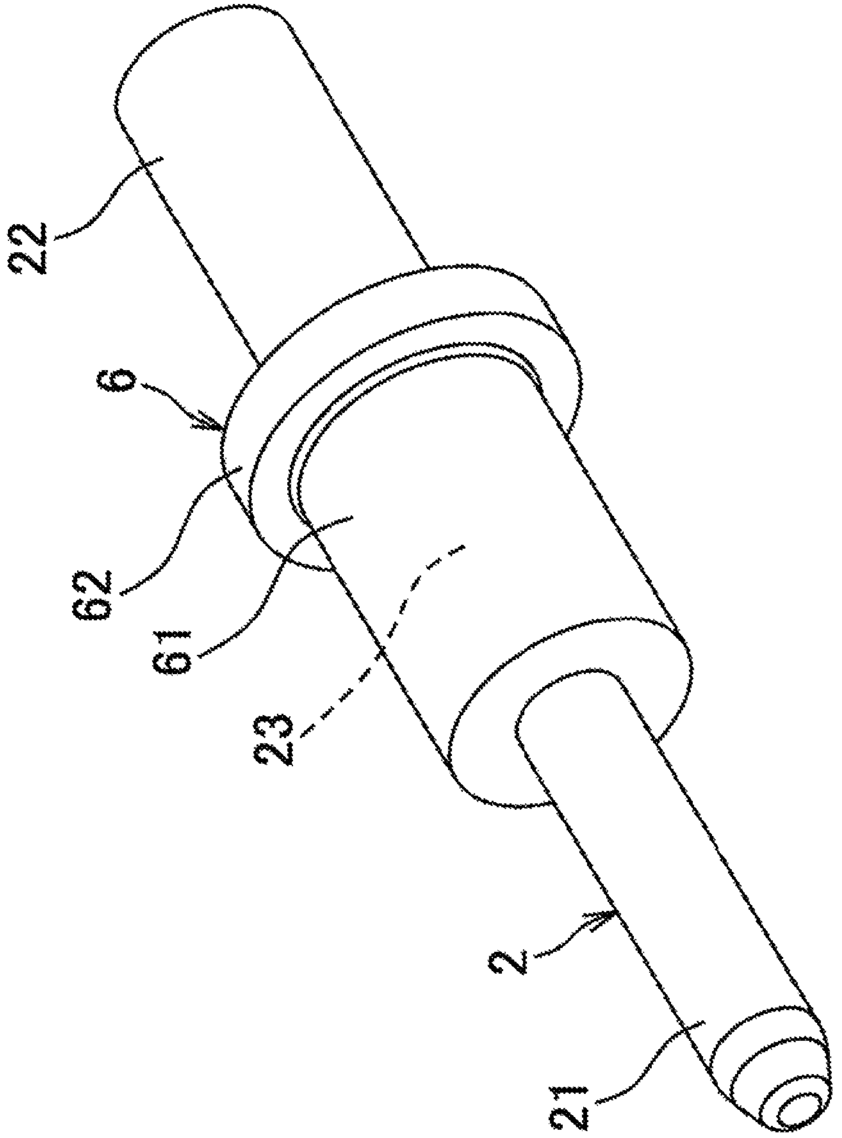
FIG. 4 shows a perspective view of a terminal and a rubber component according to FIG. 3.
Figure 5:
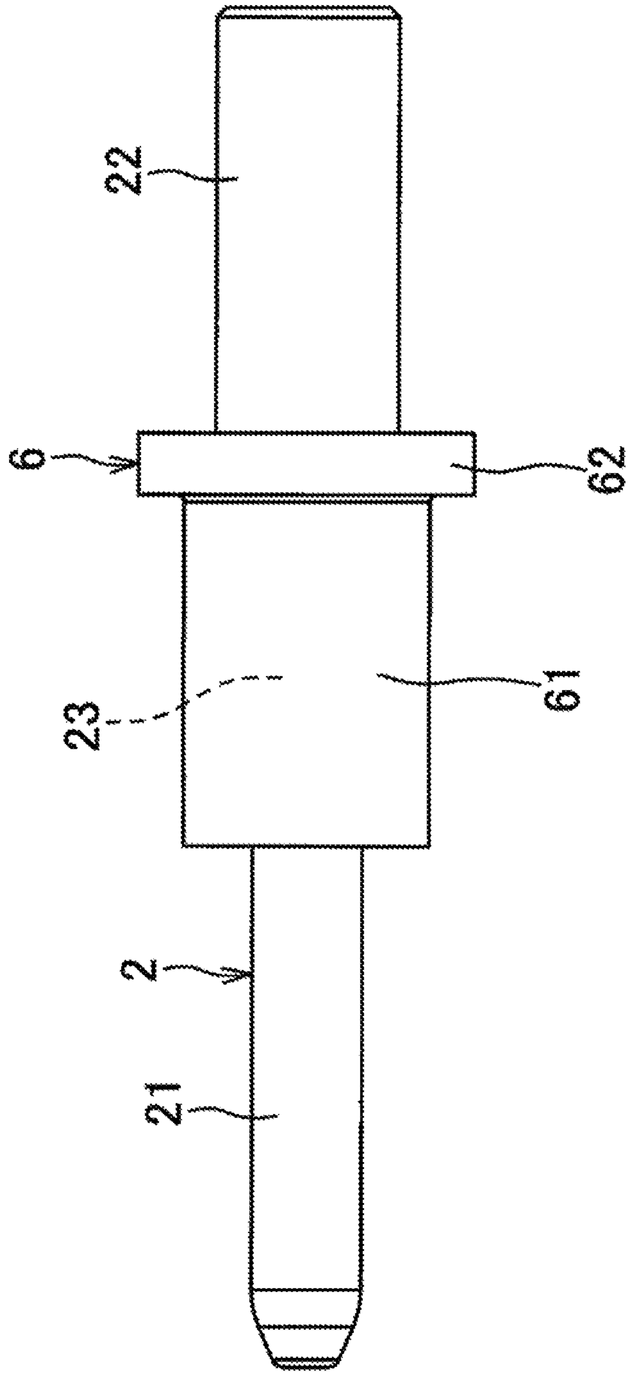
FIG. 5 shows a plan view of the terminal and rubber component according to FIG. 4.
Figure 6:
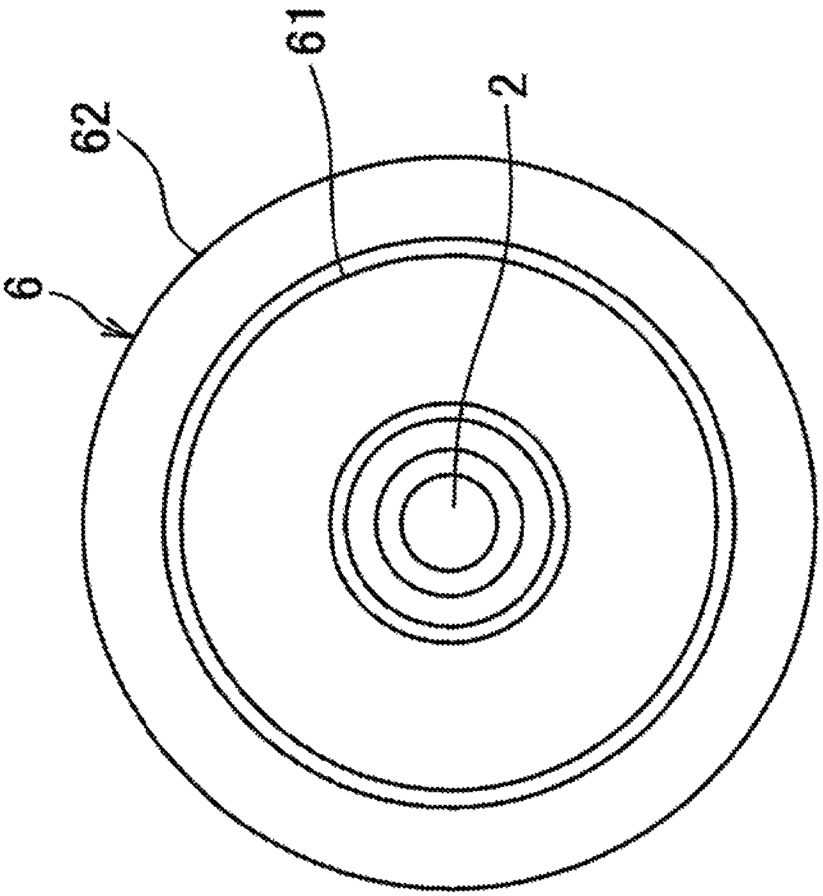
FIG. 6 shows a front view of the terminal and rubber component according to FIG. 4.
Figure 7:
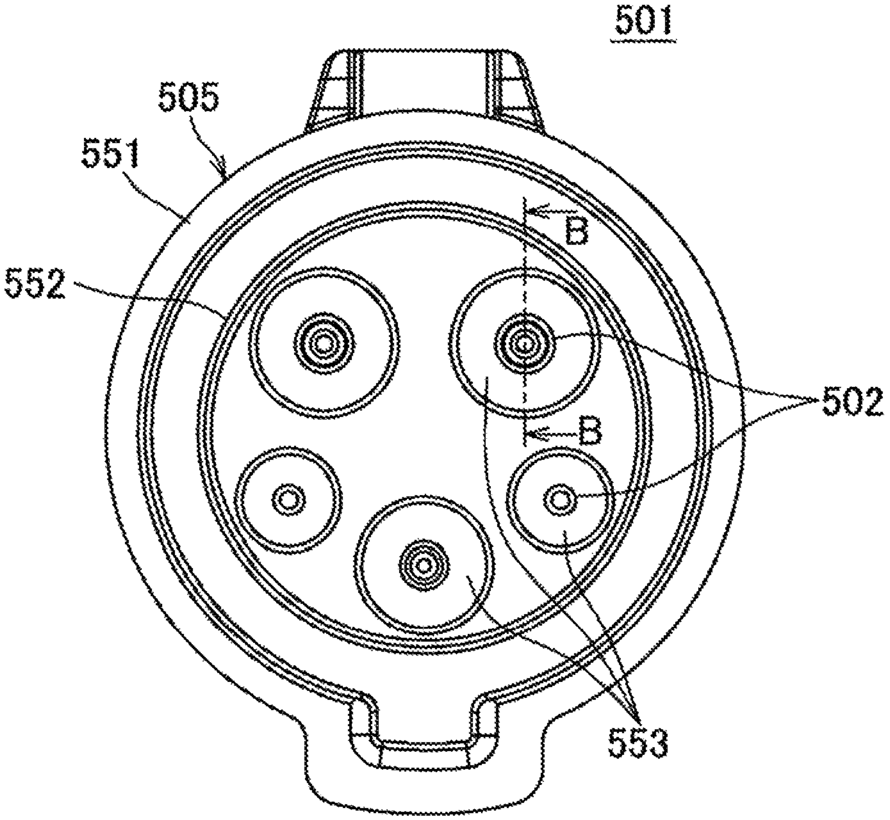
PRIOR ART FIG. 7
FIG. 7 shows a front view of a conventional charging inlet.
Figure 8:
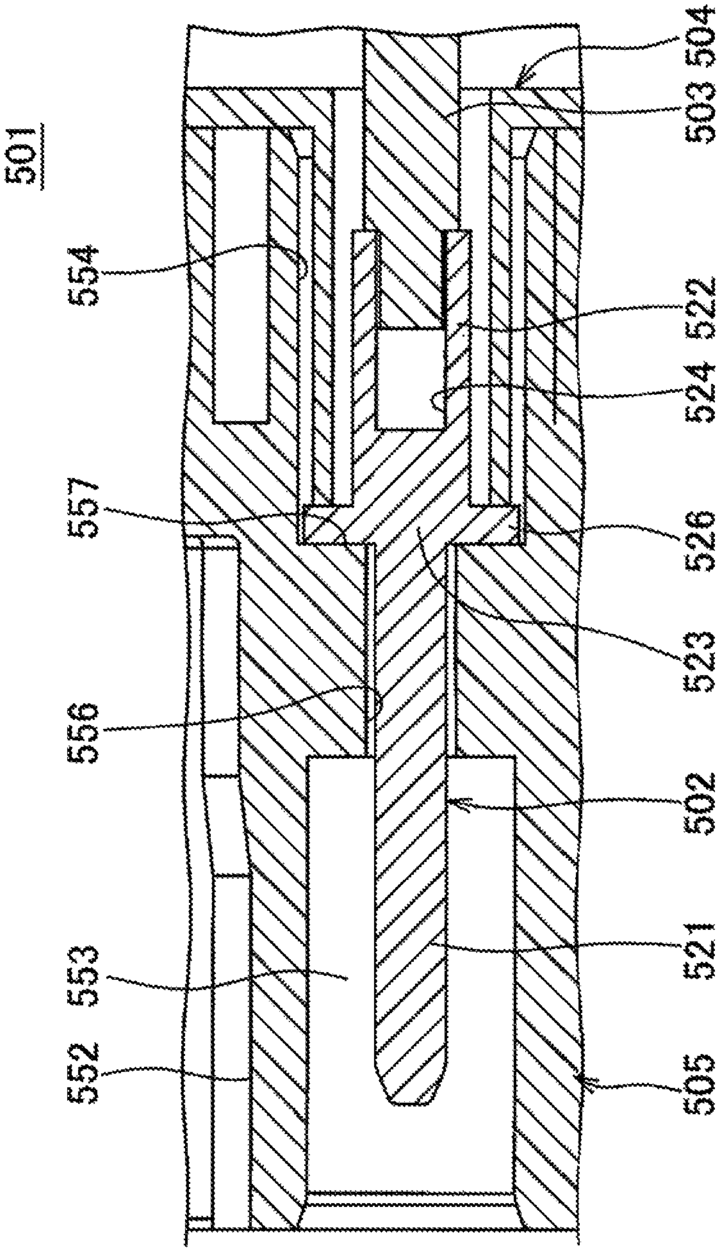
PRIOR ART FIG. 8
FIG. 8 shows a sectional view along the line B-B in FIG. 7.
Figure 9:
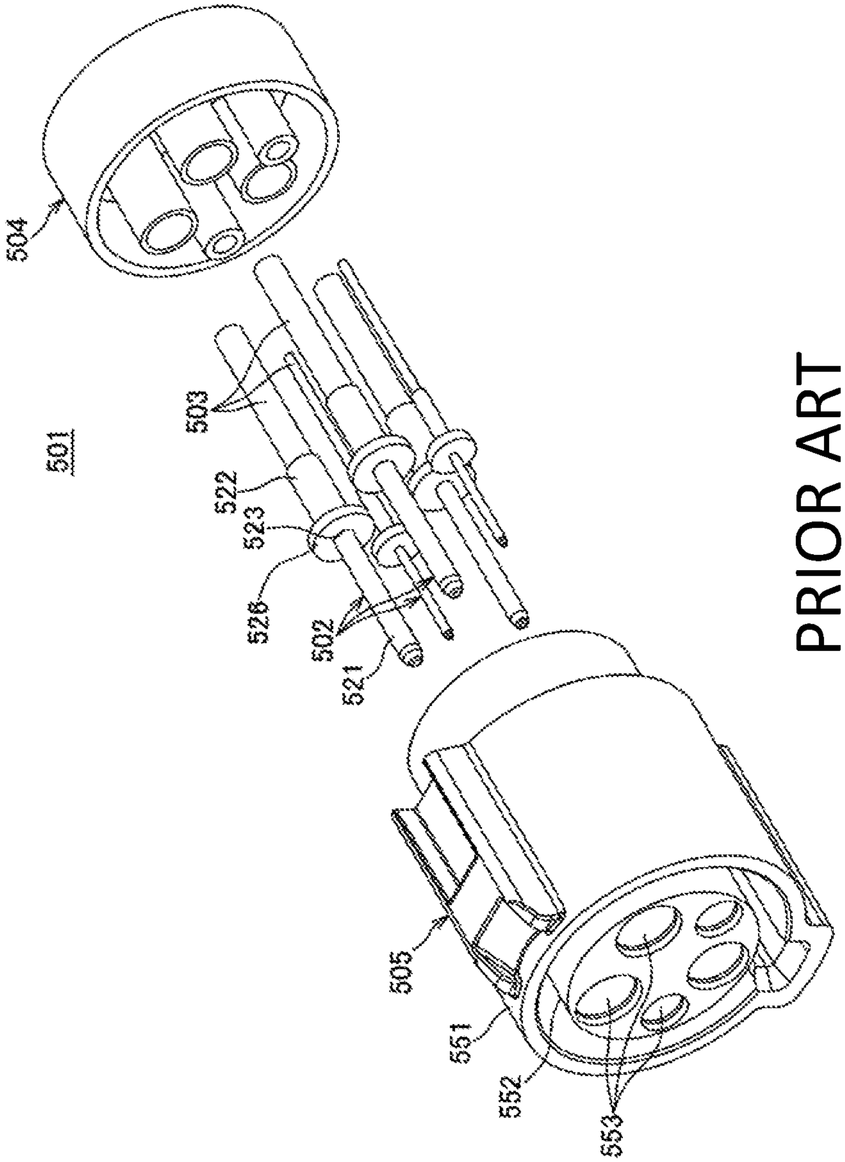
PRIOR ART FIG. 9
FIG. 9 shows an exploded view of the charging inlet according to FIG. 7.

The terminals 2 are made of copper and shaped by means of cutting. As shown in FIGS. 2, 4 and 5, each of the terminals 2 includes a first connected portion 21 formed in a solid cylindrical shape, a second connected portion 22 disposed coaxially with the first connected portion 21, and a middle portion 23 between the first connected portion 21 and the second connected portion 22.

The first connected portion 21 is a portion intended to be mated with a terminal provided in the charging plug.

The second connected portion 22 is a portion electrically connected to an electric wire 3. The second connected portion 22 is formed in a cylindrical shape, wherein the second connected portion 22 includes a recess 24 with the electric wire 3 inserted therein. The recess 24 is open opposite to the first connected portion 21.

A ring-shaped concave groove 25 is formed in an outer circumference of the middle portion 23. Furthermore, a rubber component 6 is disposed on the outer circumference of the middle portion 23. The rubber component 6 is molded and integrated with the terminal 2 by means of insert molding in which the terminal 2 is placed in a mold for producing the rubber component 6. The rubber component 6 is further embedded in a communication portion 55 of the housing 5.

As shown in FIGS. 2 to 6, the rubber component 6 includes a cylindrical portion 61 and a flange 62. The cylindrical portion 61 is disposed on a portion of the middle portion 23 which is closer to the first connected portion 21 than the ring-shaped concave groove 25. The flange 62 is connected to an end of the cylindrical portion 61 facing the second connected portion 22 and is formed in a ring shape with a larger diameter than the cylindrical portion 61. Furthermore, the flange 62 is formed with a larger diameter than any portion of the terminal 2. The flange 62 is provided so as to fill the ring-shaped concave groove 25. An outer circumferential surface of the flange 62 is positioned outside the ring-shaped concave groove 25.

The housing 5 consists of an insulating synthetic resin. The housing 5 includes an inner housing 52 and a hood section 51 surrounding the inner housing 52, wherein the inner housing 52 accommodates the plurality of terminals 2 therein. For each of the terminals 2, the inner housing 52 includes a first accommodating portion 53, a second accommodating portion 54, a communication portion 55, and a ring-shaped concave groove 56 formed therein.

The first accommodating portion 53 is configured as a space which is open toward a front side of the charging inlet 1, wherein the first accommodating portion 53 accommodates a front half of the first connected portion 21.

The second accommodating portion 54 is configured as a space which is open toward a back side of the charging inlet 1, wherein the second accommodating portion 54 accommodates the second connected portion 22.

The communication portion 55 is a portion through which the first accommodating portion 53 is in communication with the second accommodating portion 54, wherein the communication portion 55 accommodates a back half of the first connected portion 21 and the middle portion 23. Furthermore, a rubber component 6 is interposed between an inner surface of the communication portion 55 and the terminal 2.

The ring-shaped concave groove 56 is concave from the inner surface of the communication portion 55, wherein a portion of the flange 62 is embedded in the ring-shaped concave groove 56.

In this manner, the rubber component 6 is interposed between the housing 5 and the middle portion 23 of each of the terminals 2, whereby the terminals 2 are held in the housing 5 without causing assembly instability in a radial direction as well as in a direction of the center axis. This means that no terminal holder is necessary for the charging inlet 1. Furthermore, the terminals 2 are displaceable in the radial direction by elastically deforming the rubber component 6. This enables a radial position of the terminal 2 to be adjusted inside the inner housing 52 depending on terminal misalignment of the charging plug, which allows electric transmission stability to be achieved.

The charging inlet 1 is produced by successively applying a terminal shaping step, a rubber component molding step, a plating step, a connecting step of connecting the second connected portion 22 to the electric wire 3, and a housing molding step.

Figure 10:
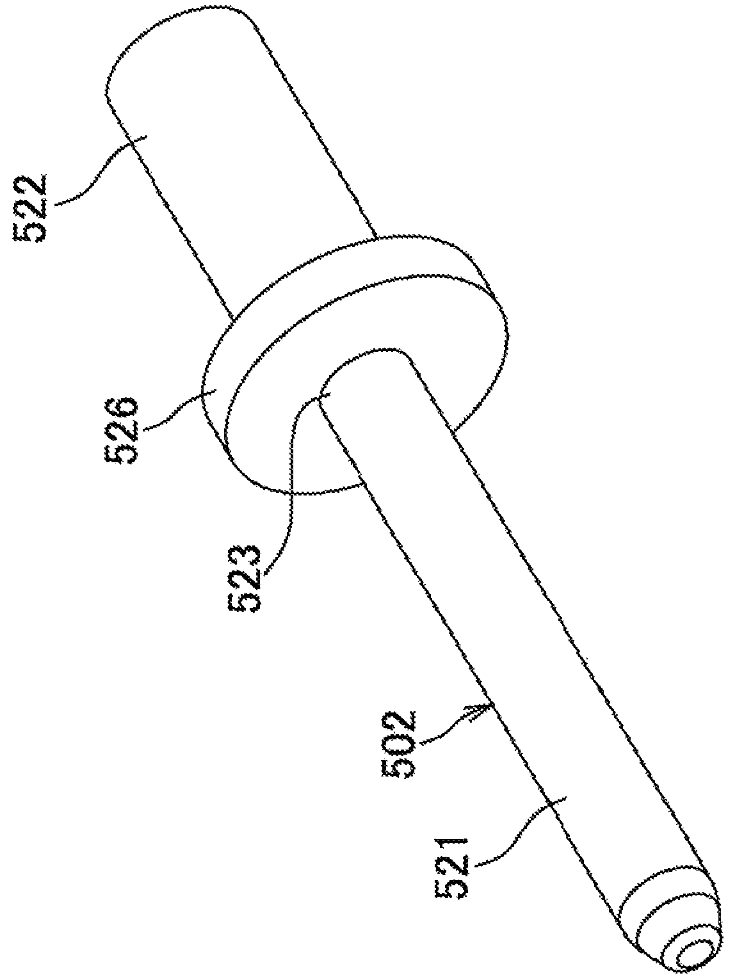
PRIOR ART FIG. 10
FIG. 10 shows a perspective view of a terminal according to FIG. 9.

In the terminal shaping step, the terminal 2 are shaped by means of cutting. Conventionally, a terminal 502 (see FIG. 10) is shaped by being cut out of a base material adapted to a diameter of a flange 526, which causes a large amount of waste of material during cutting. In this regard, the present example enables the terminal 2 to be processed by using a minimum diameter of base material as required so that it is possible to reduce an amount of waste of copper material and thus the costs.

In the rubber component molding step, the rubber component 6 is molded by means of insert molding in which the terminal 2 is placed in a mold for producing the rubber component 6. In this rubber component molding step, the rubber component 6 is integrated with the terminal 2. As describe above, a portion (an inner circumferential side) of the flange 62 enters the ring-shaped concave groove 25, which makes it difficult to remove (detach) the rubber component 6 from the terminal 2.

In the plating step, an exposed outer surface of the terminal 2 is plated except for a portion of the terminal 2 with the rubber component 6 disposed thereon. Conventionally, the terminal 502 (see FIG. 10) is also plated on the flanges 526 which does not need to be plated, which causes a large amount of plating material used. In this regard, the terminal 2 according to the present example is plated only on a portion which needs to be plated, whereby a reduced amount of plating material is used and the costs can be thus reduced.

In the housing molding step, the housing 5 is molded by means of insert molding in which the terminal 2 integrated with the rubber component 6 is placed in a mold for producing the housing 5. As describe above, a portion (an outer circumferential side) of the flange 62 enters the ring-shaped concave groove 56, which makes it difficult to remove (detach) the rubber component 6 from the housing 5.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1 Charging inlet
2 Terminals
5 Housing
6 Rubber component
21 First connected portion
22 Second connected portion
23 Middle portion
61 Cylindrical portion
62 Flange

What is claimed is:

1. A charging inlet comprising:
a terminal; and
a housing accommodating the terminal therein,
wherein the terminal includes:
a first connected portion having a solid cylindrical shape;
a second connected portion disposed coaxially with the first connected portion; and
a middle portion between the first connected portion and the second connected portion,
wherein a rubber component is disposed on an outer circumference of the middle portion,
wherein the rubber component includes:
a cylindrical portion; and
a flange connected to the cylindrical portion and having a ring shape with a larger diameter than the cylindrical portion, wherein the rubber component is embedded in the housing, and
wherein the rubber component is interposed between the housing and the terminal so that the terminal is held in a displaceable manner by the housing.

2. The charging inlet according to claim 1,
wherein the flange has a larger diameter than any portion of the terminal.

3. A method of producing the charging inlet according to claim 1, successively comprising:
a terminal shaping step of shaping the terminal by means of cutting;
a rubber component molding step of molding the rubber component by means of insert molding in which the terminal is placed in a mold for producing the rubber component;
a plating step of plating an exposed outer surface of the terminal except for a portion of the terminal with the rubber component disposed thereon; and
a housing molding step of molding the housing by means of insert molding in which the terminal integrated with the rubber component is placed in a mold for producing the housing.

4. A method of producing the charging inlet according to claim 2, successively comprising:
a terminal shaping step of shaping the terminal by means of cutting;
a rubber component molding step of molding the rubber component by means of insert molding in which the terminal is placed in a mold for producing the rubber component;
a plating step of plating an exposed outer surface of the terminal except for a portion of the terminal with the rubber component disposed thereon; and
a housing molding step of molding the housing by means of insert molding in which the terminal integrated with the rubber component is placed in a mold for producing the housing.

* * * * *